(12) United States Patent
Kobayashi et al.

(10) Patent No.: US 7,386,067 B2
(45) Date of Patent: *Jun. 10, 2008

(54) FREQUENCY OFFSET CANCELLATION CIRCUIT FOR DATA DETERMINATION IN WIRELESS COMMUNICATIONS

(75) Inventors: Takao Kobayashi, Saku (JP); Masaaki Shida, Hachioji (JP); Kazuhiko Kawai, Takasaki (JP)

(73) Assignees: Renesas Technology Corporation, Tokyo (JP); Hitachi Engineering Co., Ltd., Ibaraki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/580,009

(22) Filed: Oct. 13, 2006

(65) Prior Publication Data

US 2007/0030928 A1 Feb. 8, 2007

Related U.S. Application Data

(63) Continuation of application No. 10/200,339, filed on Jul. 23, 2002, now Pat. No. 7,136,433.

(30) Foreign Application Priority Data

Aug. 28, 2001 (JP) .............................. 2001-257943

(51) Int. Cl.
*H03D 1/00* (2006.01)

(52) U.S. Cl. ...................... 375/340; 375/315; 375/316; 375/317; 375/344

(58) Field of Classification Search ................ 375/340, 375/316, 317, 344; 329/315
See application file for complete search history.

(56) References Cited

U.S. PATENT DOCUMENTS

| | | | |
|---|---|---|---|
| 5,361,276 | A | 11/1994 | Subramanian |
| 5,412,695 | A | 5/1995 | Murata |
| 5,546,433 | A | 8/1996 | Tran et al. |
| 5,809,009 | A | 9/1998 | Matsuoka et al. |
| 5,818,882 | A | 10/1998 | Komatsu |
| 6,463,266 | B1 | 10/2002 | Shohara |
| 6,504,498 | B1 | 1/2003 | O'Brien |
| 6,658,063 | B1 | 12/2003 | Mizoguchi et al. |

*Primary Examiner*—Mohammed Ghayour
*Assistant Examiner*—Juan Alberto Torres
(74) *Attorney, Agent, or Firm*—Reed Smith LLP; Stanley P. Fisher, Esq.; Juan Carlos A. Marquez, Esq.

(57) ABSTRACT

A demodulating semiconductor integrated circuit device used in a wireless communication system of an FM-modulation scheme, wherein a circuit for canceling a frequency offset is made of a digital circuit, so as to make a high-accuracy decision as to received data and prevent error frequency offset cancel due to a pseudo pattern contained in the received data. Consequently, a high-accuracy received data decision is carried out.

6 Claims, 10 Drawing Sheets

FREQUENCY OFFSET CANCELLATION CIRCUIT FOR DATA DETERMINATION IN WIRELESS COMMUNICATIONS

CROSS-REFERENCE TO RELATED APPLICATION

This application is a Continuation application of U.S. application Ser. No. 10/200,339 filed Jul. 23, 2002 now U.S. Pat. No. 7,136,433. Priority is claimed based on U.S. application Ser. No. 10/200,339 filed Jul. 23, 2002, which claims the priority of Japanese Patent Application No. 2001-257943 filed on Aug. 28, 2001, all of which is incorporated by reference.

BACKGROUND OF THE INVENTION

The present invention relates to a technology for correcting a frequency offset in a reception-system circuit of a wireless communication system, and to, for example, a technology effective for application to a frequency offset cancel circuit provided in a reception-system circuit of a wireless communication system which adopts a frequency hopping method.

In transmission of data by a wireless communication of an FM-modulation scheme, a carrier wave (carrier frequency signal) is frequency-modulated by transmit data to thereby superimpose signal components on the carrier wave, whereby the transmission of the data is carried out. A transmitting side performs the generation of the carrier wave and superimposition of the signal components on the carrier wave and outputs the resultant data, whereas a receiving side eliminates a carrier component from a received signal to thereby extract a signal component. Further, the receiving side demodulates data of "0" and "1" (correspondence between high and low levels of frequency and "0" and "1" is arbitrary) according to whether the frequency of the received signal is higher or lower than the frequency of the carrier wave. The generation and elimination of the carrier wave are generally carried out using oscillation signals of VCOs (Voltage-Controlled Oscillators) respectively provided on the transmitting side and the receiving side.

However, the VCOs on the transmitting and receiving sides have variations respectively. A frequency offset is developed in the received signal. Further, there may be respectively. A frequency offset is developed in the received signal. Further, there may be cases in which an offset lying in a given range is allowed for each of oscillation frequencies of the respective VCOs on the transmitting and receiving sides depending on specs of wireless communications. In a Bluetooth standard that sets rules on the transmission of data by wireless communications among peripheral devices such as a personal computer, a printer, etc., an offset of 75 kHz is allowed for the transmission system as an initial offset, an offset of 50 kHz is allowed for the reception system, and an offset of 125 kHz in total is allowed for the receiving side.

If the offset component is not corrected on the receiving side in such a case, then a frequency value used as a decision threshold value of "0" or "1" is not determined and hence the receive or received data cannot be demodulated properly. An example illustrative of a signal waveform containing an offset is shown in FIG. 15. In FIG. 15, a vertical axis indicates a frequency modulating direction, and a horizontal axis indicates a time base. When no offset is contained in the signal waveform, "0" and "1" of data can be determined according to whether a modulation level is higher or lower than a frequency modulation level with the frequency modulation level "0" as the reference. In the signal waveform shown in FIG. 15, however, the modulation level of the whole received signal is shifted in a + direction due to the influence of an offset component. Thus, the determination may preferably be made to such a waveform as shown in FIG. 15 by setting a determination level of "0" or "1" (threshold) to a level of 3.0.

SUMMARY OF THE INVENTION

A signal processing LSI for modulating and demodulating a transmit-receive signal for wireless communications has heretofore been configured using an analog circuit in general. Since, however, the analog circuit varies in circuit characteristic due to variations in elements constituting the circuit and is degraded in accuracy, circuit's digitization has been put forward in recent years. Therefore, the above offset elimination may also preferably be implemented by the digital circuit. Since a wireless communication of a spectrum diffusion system like Bluetooth is affected by interfering waves resultant from the same frequency band and an adjacent frequency band in particular, it is necessary to develop a digital circuit capable of eliminating an offset at high speed in the presence of the interfering waves.

Further, a frequency hopping-based spectrum diffusion system has been adopted in the Bluetooth standard. Since a transmission frequency band changes for each predetermined time, there is a need to eliminate an offset at high speed even for the purpose of efficiently carrying out transmission. Incidentally, frequency hopping is carried out for each 1 MHz in a frequency band of from 2.4 GHz to 2.48 GHz in the Bluetooth standard to prevent interference between signals lying in an adjacent frequency band.

Meanwhile, the Bluetooth standard provides or defines that a 0/1 alternate pattern called a 4-bit preamble pattern comprising 0101 (or 1010) is inserted before a data section in regard to the format of a transmission packet. Thus, the preamble pattern is detected and its center level is further detected, after which it is defined as a threshold, whereby a frequency offset can be canceled and a decision as to "0" and "1" of subsequent data can be carried out accurately.

However, as a result of an investigation of this determining method by the present inventors, when an interference exists, a pattern similar to a preamble pattern designated at sign A might be contained in such a portion as designated at sign B in which data of "0" or "1" other than the preamble pattern designated at sign B is continuous, as illustrated in FIG. 6 showing an example of a received-signal waveform. It has been found that if an offset cancel circuit recognizes such a pattern as the preamble pattern, then the proper offset cancel cannot be carried out and a decision as to "0" and "1" of subsequent data is erroneously made.

An object of the present invention is to provide a communication semiconductor integrated circuit device used in a wireless communication system of an FM-modulation scheme, wherein a circuit for canceling a frequency offset comprises a digital circuit, whereby a high-accuracy decision as to received data can be carried out.

Another object of the present invention is to provide a communication semiconductor integrated circuit device capable of preventing false frequency offset cancel and thereby making a high-accuracy decision as to received data.

A further object of the present invention is to particularly provide a demodulating semiconductor integrated circuit device suitable for a configuration of a wireless communication system of a frequency hopping method.

The above, other objects and novel features of the present invention will become apparent from the description of the present specification and the accompanying drawings.

A summary of a typical one of the inventions disclosed in the present application will be described as follows:

A communication semiconductor integrated circuit device used in a communication system that complies with a communication scheme defined so as to carry out data transmission with a predetermined pattern being added to the head of data, includes a demodulator which demodulates data modulated according to a frequency modulation scheme, an offset cancel circuit which recognizes a predetermined pattern from the demodulated data to detect a frequency offset, thereby generating a data determination level, and a data determination circuit which makes a "1"/"0" decision as to the data demodulated by the demodulator, based on the determination level generated by the offset cancel circuit. In the communication semiconductor integrated circuit device, the offset cancel circuit is made up of a digital circuit. For example, the offset cancel circuit comprises a circuit which detects the predetermined pattern, a circuit which detects a center level of the received data, and a circuit which generates a determination level used in the data determination circuit from a signal for detecting the predetermined pattern and the detected center level.

According to the means referred to above, since the circuit for canceling the offset of the frequency is made up of the digital circuit, variations in circuit characteristic due to device variations developed when it comprises an analog circuit can be eliminated and a high-accuracy decision as to the received data can be performed.

When the predetermined pattern is of a "0"/"1" or "1"/"0" alternate pattern, the circuit for detecting the predetermined pattern is provided with a level averaging circuit for detecting an average level of the received data, and an intersection-point interval detection circuit for detecting intervals between intersection points of the detected average level and the received data, and is configured so as to output the predetermined pattern detect signal when intersection-point intervals lying within an allowable range are rendered continuous by a predetermined number. Thus, it is possible to prevent the generation of a false determination level due to a pseudo pattern contained in the received data, i.e., erroneous frequency offset cancellation. As a result, a high-accuracy decision as to the received data can be carried out.

DETAILED DESCRIPTION OF THE PREFERRED EMBODIMENTS

Preferred embodiments of the present invention will hereinafter be described with reference to the accompanying drawings.

Figure 1:
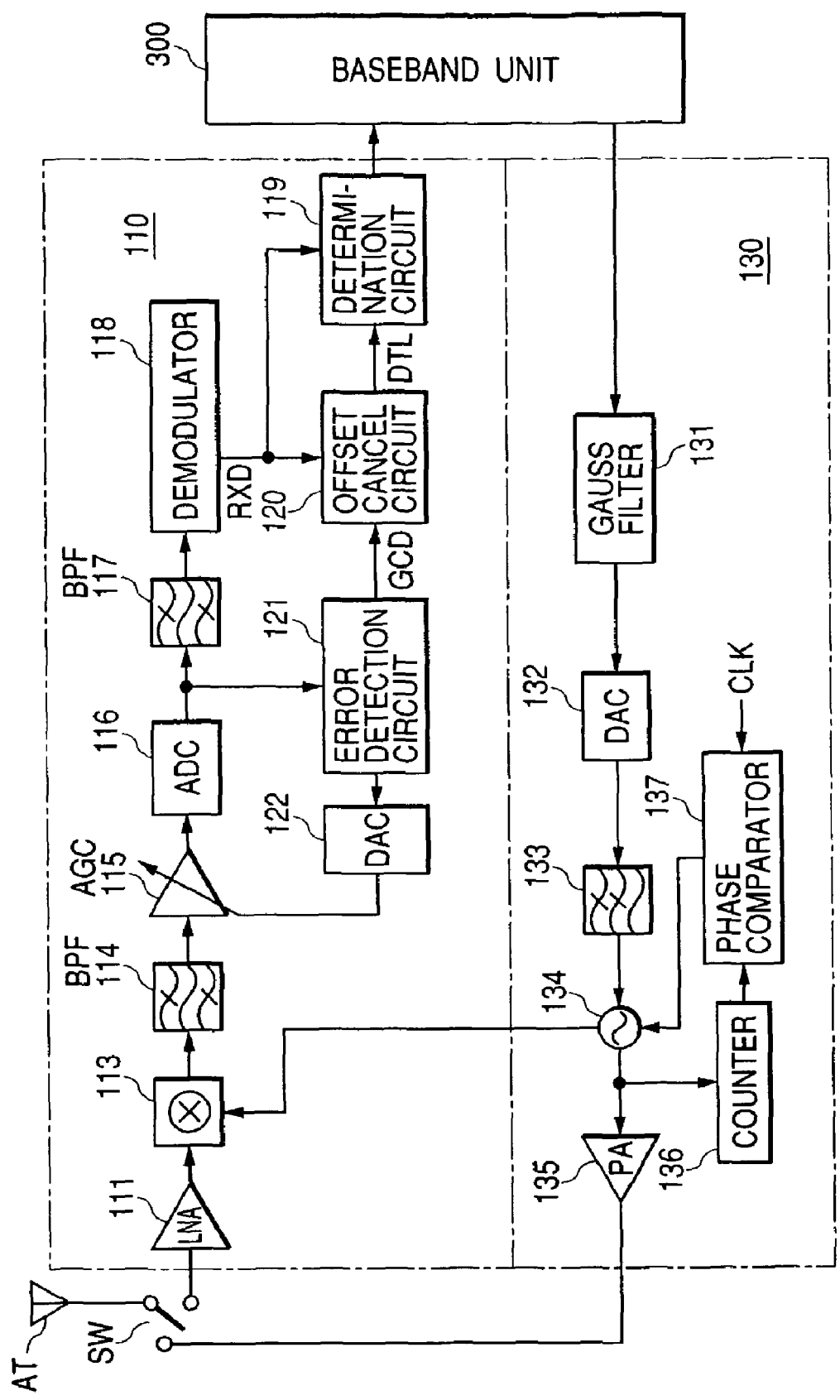
FIG. 1 is a block diagram showing an example of a configuration of a wireless communication system suitable for use with a demodulating semiconductor integrated circuit device according to the present invention.

An example of a configuration of a wireless communication system suitable for use with a communication semiconductor integrated circuit device according to the present invention is shown in FIG. 1.

In FIG. 1, AT indicates a signal wave transmitting/receiving antenna, SW indicates a transmit-receive selector switch, reference numeral 110 indicates a reception-system circuit for down-converting a signal received by the antenna AT to an intermediate frequency, demodulating and amplifying it, and converting it to a baseband signal, reference numeral 130 indicates a transmission-system circuit for modulating transmit data and transmitting it from the antenna AT, and reference numeral 300 indicates a baseband unit for performing the generation of transmit data and processing of received data, respectively.

The reception-system circuit 110 includes a low noise amplifier (LNA) 111 for amplifying the signal received by the antenna AT, a mixer (MIX) 113 for combining the received signal amplified by the LNA and the same frequency oscillation signal as a carrier wave outputted from a VCO (134) on the transmitting side to thereby down-convert the combined signal to a signal having an intermediate frequency, a bandpass filter 114 for eliminating a leak signal produced from an adjacent channel and extracting a signal component of the corresponding channel, a gain-variable programmable gain amplifier (AGC) 115 for amplifying the received signal to predetermined amplitude, an AD converter 116 for converting an analog received signal to a digital signal, a digital filter 117, a demodulator 118 for demodulating the received data, and a determination circuit 119 for making a decision as to data of "0" and "1" from the demodulated signal. The data discriminated by the determination circuit 119 is passed to the baseband unit 300.

Further, the reception-system circuit 110 is also provided with an offset cancel circuit 120 for eliminating a frequency offset, an error detection circuit 121 for detecting the difference between the amplitude of the received signal and target amplitude, a DA converter 122 for generating a gain control signal for the amplifier (AGC) 115 according to the detected difference and performing control so as to obtain predetermined output amplitude, etc. The determination circuit 119 makes a decision as to the received data, based on an offset value detected by the offset cancel circuit 120.

The transmission-system circuit 130 comprises a Gauss filter 131 for sampling an input rectangular-wave signal (so-called baseband signal) inputted from the baseband unit 300 to thereby generate a code for modulation, a DA converter 132 for DA-converting the output of the filter 131 into analog form to thereby generate a signal having a stepwise waveform, a low-pass filter 133 for bringing the generated stepwise-waveform signal into a smooth waveform, a frequency converter, which includes the voltage-controlled oscillator (VCO) 134, used as a modulator for performing modulation under the control of an oscillation frequency of the voltage-controlled oscillator (VCO) based on a voltage outputted from the low-pass filter 133, a power amplifier 135 for driving the antenna AT in response to a frequency-converted signal and thereby transmitting a signal wave, etc.

Further, the frequency converter employed in the present embodiment is provided with a counter 136 for dividing the output of the VCO (134), and a phase comparator 137 for comparing the phase of the output of the counter 136 with the phase of a reference clock CLK like, for example, 13 MHz, and generating a voltage corresponding to the difference in phase therebetween to thereby control the oscillation frequency of the VCO (134). The VCO (134), the counter 136 and the phase comparator 137 constitute a PLL (Phase-Locked Loop) circuit, which generates a carrier frequency signal (carrier wave). The oscillation frequency of the VCO (134) is changed according to the output voltage of the low-pass filter 133 on which the transmit data is reflected, to thereby modulate a carrier frequency signal.

The wireless communication system according to the present embodiment is configured in such a manner that a count to be counted by the counter 136, which has been set to a register provided incident to the counter 136, is changed by settings made from the baseband unit 300, whereby data transmission of a so-called frequency hopping-based spectrum diffusion system can be carried out while the carrier frequency is being shifted in units like 1 MHz, for example.

Figure 2:
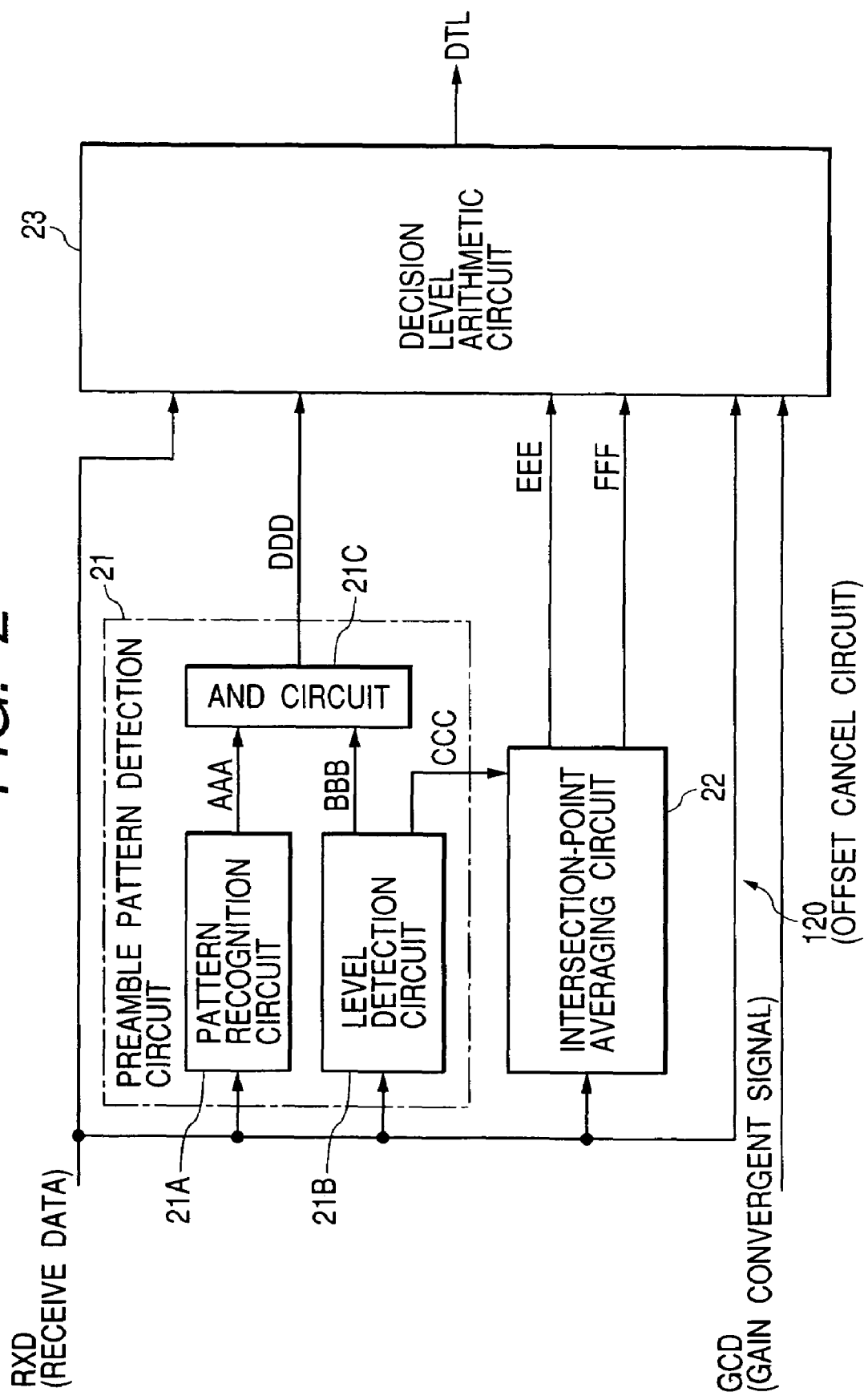
FIG. 2 is a circuit diagram illustrating one embodiment of an offset cancel circuit which constitutes a reception-system circuit.

One embodiment of the offset cancel circuit 120 constituting the reception-system circuit 110 is shown in FIG. 2. The offset cancel circuit 120 of the present embodiment comprises a preamble pattern detection circuit 21 for detecting a preamble pattern, an intersection-point averaging circuit 22 for calculating an initial value of an offset, a decision level arithmetic circuit 23 for generating a level (threshold value) DTL for making a decision as to "0" and "1" of received data, based on signals outputted from the intersection-point averaging circuit 22 and the preamble pattern detection circuit 21, etc.

The preamble pattern detection circuit 21 comprises a pattern recognition circuit 21A for detecting an alternate pattern of "0" and "1" from the received data RXD demodulated by the demodulator 118, a level detection circuit 21B for detecting a frequency modulation level of the alternate pattern, and an AND circuit 21C for ANDing the output of the pattern recognition circuit 21A and the output of the level detection circuit 21B to thereby output a preamble pattern detect signal DDD.

The intersection-point averaging circuit 22 detects intersection points of the received data RXD and data obtained by delaying it by one symbol period as will be described later, calculates a mean value of these intersection points, generates an intersection-point detect signal EEE and an intersection-point mean value FFF, and outputs them to the decision level arithmetic circuit 23. While the center level of the preamble pattern may be determined as the mean value of the maximum peak level and the minimum peak level, the present inventors have paid attention to the fact that the means value substantially coincides with the level of each of the intersection points of the received data RXD and the data obtained by delaying it by one symbol period. In the present embodiment, the level of each of the intersection points of the received data RXD and the data obtained by delaying it by one symbol period is detected, which is regarded as a decision level.

Figure 3:
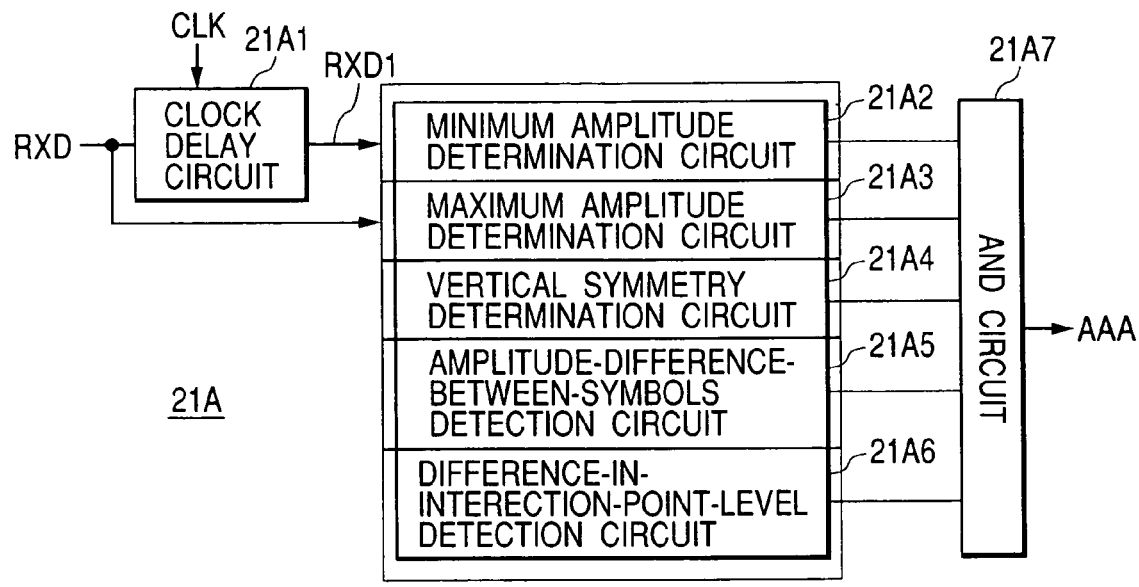
FIG. 3 is a block circuit showing an example of a more detailed configuration of a pattern recognition circuit which constitutes a preamble pattern detection circuit.

A more detailed configuration of the pattern recognition circuit 21A constituting the preamble pattern detection circuit 21 is shown in FIG. 3.

Figure 4:
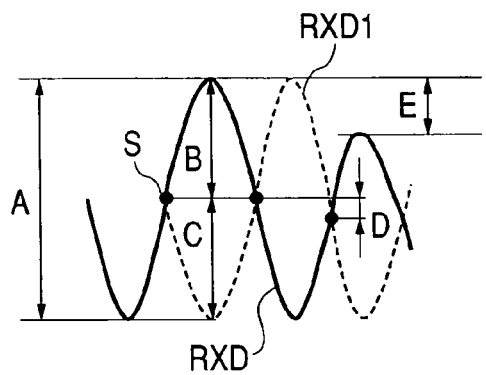
FIG. 4 is a waveform diagram illustrating the relationship between demodulated data and data obtained by delaying it by one symbol period.

The pattern recognition circuit 21A according to the present embodiment comprises a delay circuit 21A1 for delaying the demodulated received data RXD by one symbol period, a minimum amplitude determination circuit 21A2 for determining from the data RXD1 delayed by the delay circuit 21A1 and the present received data RXD, whether a fluctuation band or width A for such two symbols as shown in FIG. 4 is larger than predetermined minimum amplitude, a maximum amplitude determination circuit 21A3 for determining whether the fluctuation width A is smaller than predetermined maximum amplitude, a vertical symmetry determination circuit 21A4 for determining whether a ratio B/C between an upper peak level B and a lower peak level C with respect to intersection points S of the two symbols falls within a predetermined range, an amplitude-difference-between-symbols determination circuit 21A5 for determining whether the difference E in amplitude between the two symbols falls within a predetermined value, a difference-in-intersection-point-level detection circuit 21A6 for determining whether the difference D in level between the intersection points S of the two symbols falls within a predetermined value, and an AND circuit 21A7 for ANDing the outputs of the respective determination circuits. Further, when all the conditions are established, the pattern recognition circuit 21A is configured so as to output a high-level pattern recognition signal AAA.

When a preamble pattern or an alternate pattern (hereinafter called a "dummy or pseudo preamble pattern") of "0" and "1" similar to it is received by the present circuit, the pattern recognition signal AAA changes from a low level to a high level. Whether the alternate pattern is either the original preamble pattern or the pseudo preamble pattern, is determined by the AND circuit 21C from the pattern recognition signal AAA and the output signal of the level detection circuit 21B. When, for example, a transmission rate of a symbol is given as 1 Mbps and a reference clock CLK of the system is given as 13 MHz, the delay circuit 21A1 is configured as a circuit for delaying the demodulated received data RXD by 13 clock cycles and outputting it therefrom.

Figure 5:
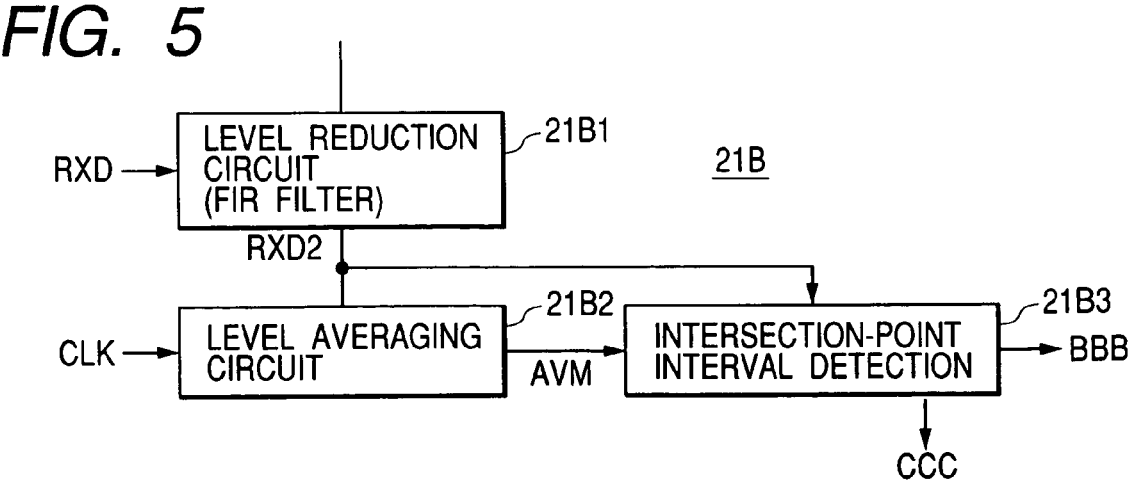
FIG. 5 is a block diagram showing an example of a more detailed configuration of a level detection circuit which constitutes the preamble pattern detection circuit.

A more detailed configuration of the level detection circuit 21B constituting the preamble pattern detection circuit 21 is shown in FIG. 5.

The level detection circuit 21B according to the present embodiment comprises a level reduction circuit 21B1 for reducing a level width of the received data RXD, a level averaging circuit 21B2 for calculating a middle point of a modulation level, and an intersection-point interval detection circuit 21B3 for determining an intersection point of the data reduced by the level reduction circuit 21B1 and the output of the level averaging circuit 21B2, calculating its intersection-point interval, detecting continuity of the intersection-point interval within a set range, and outputting a signal CCC indicative of its continuity being in detection, and a signal BBB indicative of the number of sequences being greater than a predetermined number.

Figure 6:
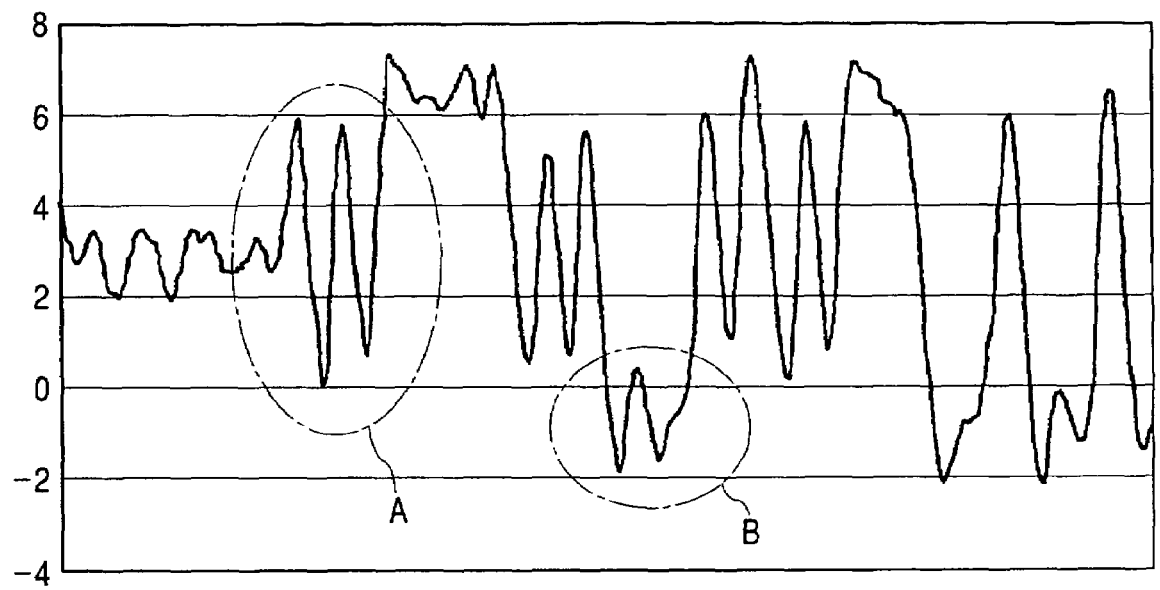
FIG. 6 is a waveform diagram illustrating one example of demodulated data.
Figure 7:
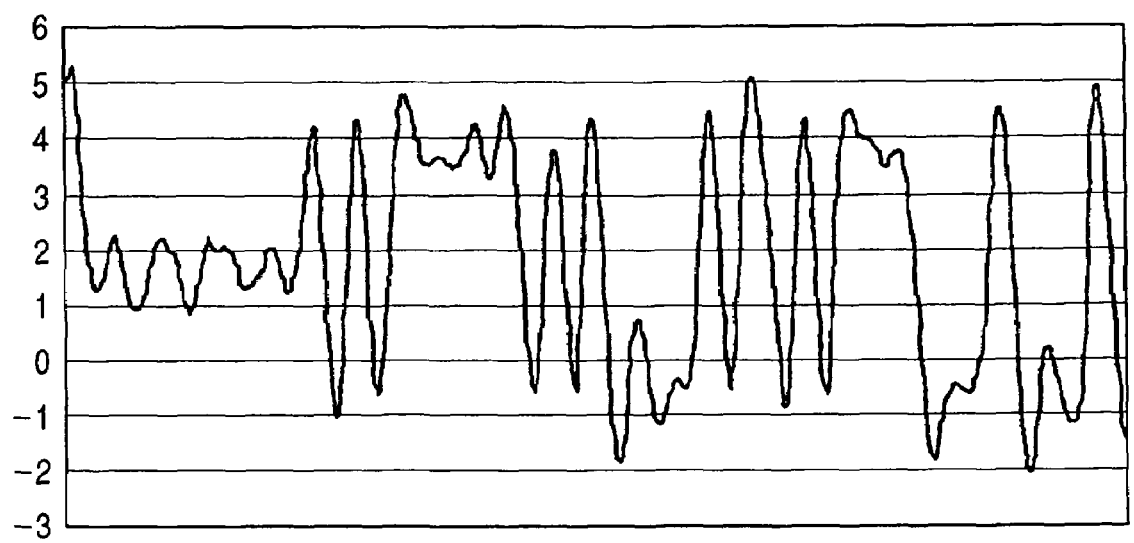
FIG. 7 is a waveform diagram showing a waveform obtained by effecting a reduction process on the demodulated data shown in FIG. 6.

The level reduction circuit 21B1 substantially proportionally reduces such demodulated data RXD as shown in FIG. 6 on a whole basis (about 7/10) to thereby generate such reduced data RXD2 as shown in FIG. 7. Thus, the difference in modulation level between an alternate pattern of "0" and "1" and a continuous pattern of "0" (or "1") is reduced so that the preamble pattern and the pseudo preamble pattern are easily distinguished from each other.

Figure 8:
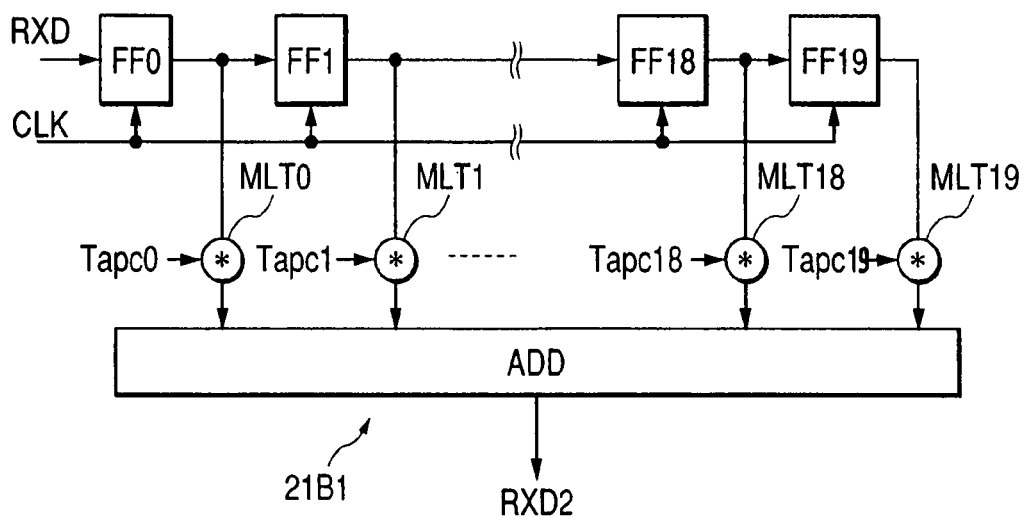
FIG. 8 is a block diagram depicting an example of a more detailed configuration of a level reduction circuit which constitutes the level detection circuit.

A more detailed configuration of the level reduction circuit 21B1 constituting the level detection circuit 21B is shown in FIG. 8. An FIR (Finite Impulse Response) type filter is used for the level reduction circuit 21B1 according to the present embodiment. Namely, the level reduction circuit 21B1 comprises a shift register comprising flip-flops FF0 to FF19 for sequentially capturing input data (demodulated data RXD), multiplexers MLT0 to MLT19 for respectively multiplying the captured data by filter coefficients Tapc0 to Tapc19, and an adder ADD for sequentially adding these results of multiplication.

Although not restricted in particular, the number of taps is set to 20 in the level reduction circuit 21B1 according to the present embodiment but not limited to it. The arbitrary number of taps can be selected according to a necessary reduction rate. Further, the tap coefficients may be arbitrarily set. Alternatively, such tap coefficients that a proximity reduction rate of a predetermined level increases, may be set. Incidentally, the level reduction circuit 21B1 according to the present embodiment is configured such that the flip-flops FF0 to FF19 are shift-operated by a reference clock CLK like 13 MHz to thereby change the results of calculations every 1/13 μs.

Figure 9:
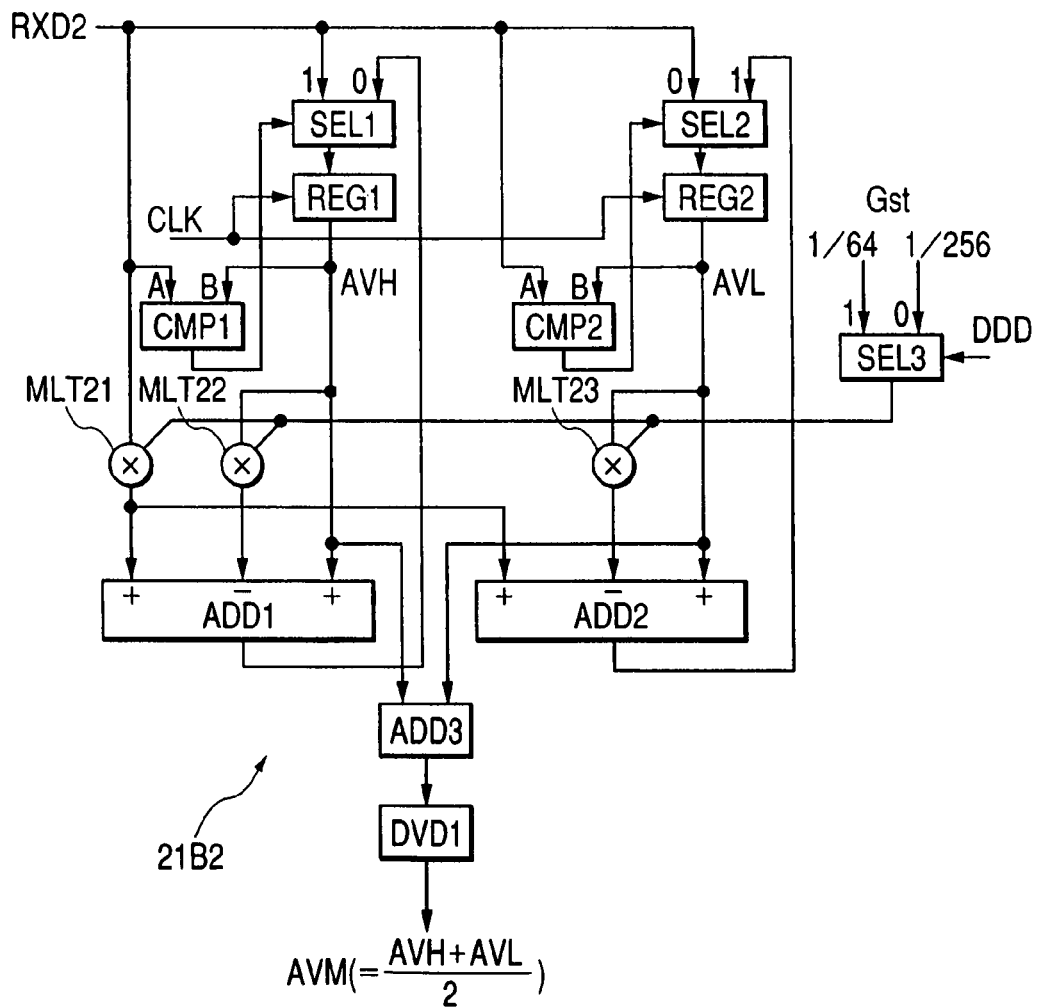
FIG. 9 is a block diagram showing an example of a more detailed configuration of a level averaging circuit which constitutes the level detection circuit.

An example of a more detailed configuration of the level averaging circuit 21B2 constituting the level detection circuit 21B shown in FIG. 5 is illustrated in FIG. 9.

Figure 10:
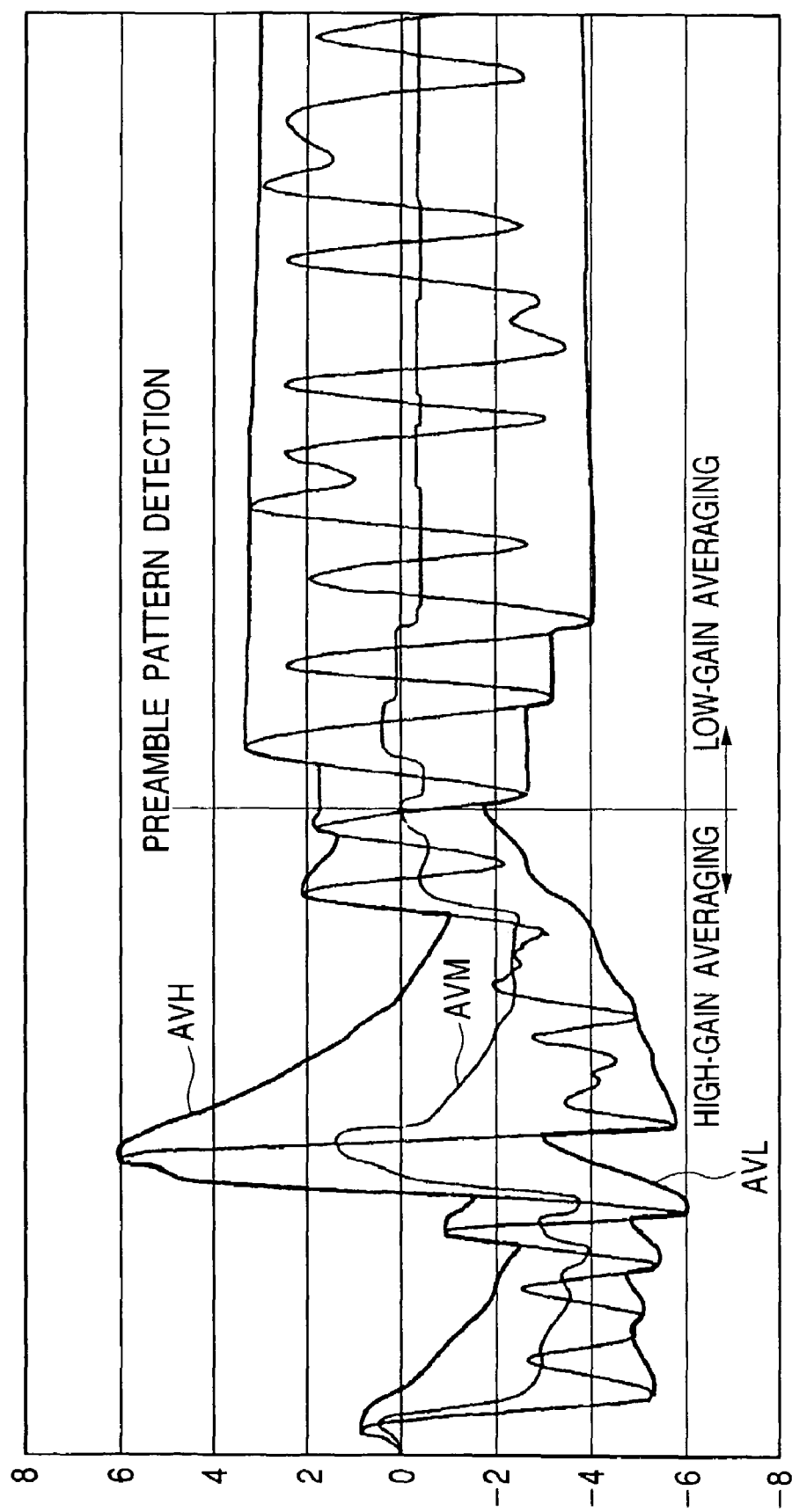
FIG. 10 is a waveform diagram illustrating a waveform of an output of the level averaging circuit.

The level averaging circuit 21B2 according to the present embodiment is a circuit for detecting such an average or mean level as indicated by a sign AVM in FIG. 10. Described specifically, the level averaging circuit 21B2 determines an average value AVM of a level average value AVH lying in a direction in which the output data RXD2 of the level reduction circuit 21B1 increases and a level average value AVL lying in a direction in which the RXD2 decreases, from the level average value AVH and the level average value AVL.

Although not restricted in particular, the level averaging circuit 21B2 according to the present embodiment averages the output data RXD2 with gain high in a level increasing direction in regard to the direction in which the output data RXD2 of the level reduction circuit 21B1 increases, and averages the output data RXD2 with gain low in its reverse direction to thereby obtain a level average value AVH. Thus, the level average value in the direction in which the output data RXD2 increases, results in a waveform which makes a rapid follow-up in the direction in which the waveform of the output data RXD2 increases, and which makes a delay follow-up in the direction in which the waveform thereof decreases, like such a waveform AVH as shown in FIG. 10.

On the other hand, the level averaging circuit 21B2 averages the output data RXD2 with gain high in a level decreasing direction in regard to the direction in which the output data RXD2 of the level reduction circuit 21B1 decreases, and averages it with gain low in its reverse direction to thereby obtain a level average value AVL. Thus, the level average value in the direction in which the output data RXD2 decreases, results in a waveform which makes a rapid follow-up in the direction in which the waveform of the output data RXD2 decreases, and which makes a delay follow-up in the direction in which the waveform thereof increases, like such a waveform AVL as shown in FIG. 10. A waveform AVM of an average level is obtained by averaging these waveforms AVH and AVL.

The level averaging circuit 21B2 shown in FIG. 9 includes a register REG1 for holding a level average value AVH lying in the direction in which the output data RXD2 of the level reduction circuit 21B1 increases, a register REG2 for holding a level average value AVL lying in the direction in which the output data RXD2 of the level reduction circuit 21B1 decreases, and comparators CMP1 and CMP2 for respectively comparing the average values held in these registers REG1 and REG2 with the data RXD2 outputted from the level reduction circuit 21B1.

The comparator CMP1 determines the magnitude between the data RXD2 outputted from the level reduction circuit 21B1 and the average value AVH up to now held in the register REG1. When the RXD2 is greater that it, the RXD2 is brought into and held in the register REG1 by a selector SEL1 controlled by the output of the comparator CMP1.

On the other hand, the comparator CMP2 makes a decision as to the magnitude between the present input data RXD2 and the level average value AVL up to now lying in the decreasing direction, which has been held in the register REG2. When the RXD2 is smaller than it, the RXD2 is taken and held in the register REG2 by a selector SEL2 controlled by the output of the comparator CMP2.

Multipliers MLT21 and MLT22 and an adder ADD1 are provided to calculate the level average value lying in the increasing direction. Further, a multiplier MLT23 and an adder ADD2 are provided to calculate the level average value lying in the decreasing direction. Of these, the multiplier MLT21 is shared between the calculations of the level average values lying in the increasing and decreasing directions. The level average value lying in the increasing direction is given by the following expression:

(RXD2×Gst)+AVH−(AVH×Gst)

where AVH indicates the average value held in the register REG1, and Gst indicates a gain set value supplied via the selector SEL3. Further, the level average value lying in the decreasing direction is given by the following expression:

(RXD2×Gst)+AVL−(AVL×Gst)

where AVL indicates the average value held in the register REG2.

When the comparator CMP1 determines that the RXD2 is smaller than the average value AVH held in the register REG1, the result of addition by the adder ADD1 is taken and held in the register REG1 by the selector SEL1. On the other hand, when the comparator CMP2 determines that the RXD2 is greater than the average value AVL held in the register REG2, the result of addition by the adder ADD2 is brought to and held in the register REG2 by the selector SEL2. Then the level average value AVH lying in the increasing direction and the level average value AVL lying in the decreasing direction both held in the registers REG1 and REG2 are added together by an adder ADD3. A value (AVH+AVL)/2 obtained by dividing an added value thereof by ½ by means of a divider DVD1 is outputted as an average level AVM.

Incidentally, the selector SEL3 selects a relatively high gain like 1/64, for example, as gain Gst before preamble pattern detection, and selects a relatively low gain like 1/256, for example, as gain Gst after the preamble pattern detection, thereby controlling averaged sensitivities so that they are switched.

The level averaging circuit 21B2 according to the present embodiment is made up of a static type circuit. The registers REG1 and REG2 are operated so as to take in or capture the outputs of the selectors SEL1 and SEL2 according to the reference clock CLK, whereby the averaged result of calculation AVM is changed for each 1/13 μs.

Figure 11:
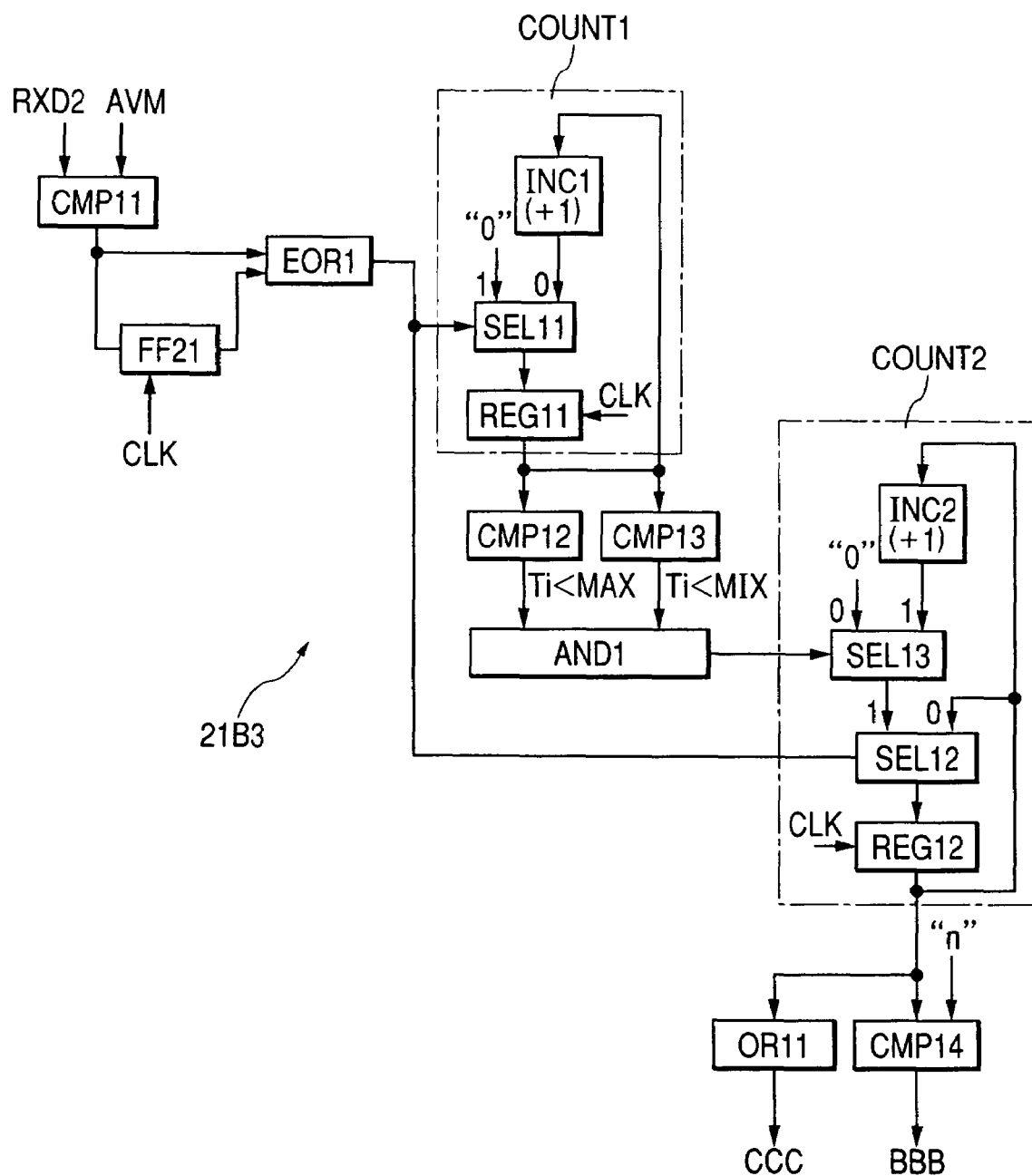
FIG. 11 is a block diagram depicting an example of a more detailed configuration of an intersection-point interval detection circuit which constitutes the level detection circuit.

An example of a more detailed configuration of the intersection-point interval detection circuit 21B3 constituting the level detection circuit 21B shown in FIG. 5 is shown in FIG. 11.

Figure 12:
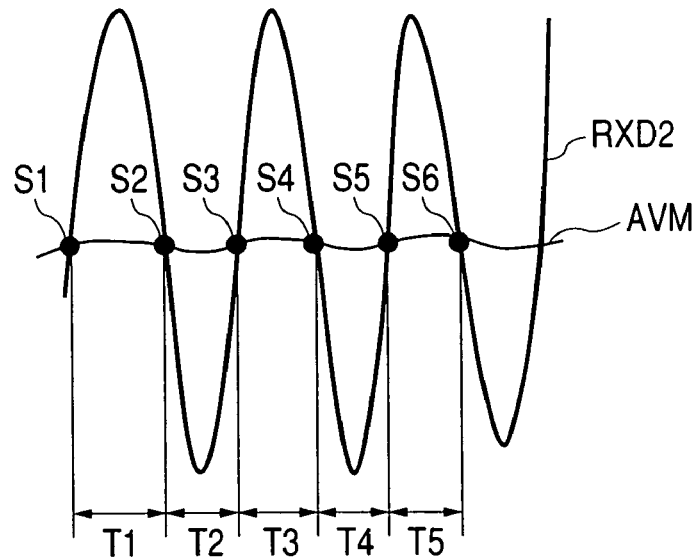
FIG. 12 is a waveform diagram showing the way of detecting intersection-point intervals by the intersection-point interval detection circuit.

The intersection-point interval detection circuit 21B3 according to the present embodiment detects intervals T1, T2, . . . among respective intersection points S1, S2, . . . of such received data RXD2 reduced by the level reduction circuit 21B1 as shown in FIG. 12 and the average level AVM calculated by the level averaging circuit 21B2, determines whether the respective intervals continuously fall within an allowable range, and outputs a signal BBB indicating that they are in succession over a predetermined number, and a signal CCC indicating that they are being detected in succession.

Therefore, the intersection-point interval detection circuit 21B3 has a comparator CMP11 for making a magnitude comparison between the received data RXD2 and the average level AVM, a flip-flop FF21 for holding the result of decision by the comparator CMP11, an OR circuit EOR1 for exclusively ORing the present result of decision by the comparator CMP11 and the immediately-preceding result of decision held in the flip-flop FF21, selectors SEL11 and SEL12 switched according to the output signal of the OR circuit EOR1, etc.

Assuming that the comparator CMP1 1 outputs a high level signal when the received data RXD2 is greater than the average level AVM, the action that the output of the OR circuit EOR1 for exclusively ORing the present result of decision and the immediately-preceding result of decision has changed from a low level to a high level, means that the present result of decision and the immediately-preceding result of decision are different from each other, i.e., a line indicative of the received data RXD2 and a line indicative of the average level AVM intersect.

"0" is inputted to one input terminal of the selector SEL11, and the output of an incrementor INC1 is inputted to the other terminal. The register REG11 is connected to an output terminal of the selector SEL11. The value held in the register REG11 is supplied to the incrementor INC1, thereby forming a loop. Thus, they constitute a counter COUNT1. The selector SEL11 selects the output of the incrementor INC1 during a period in which the output of the OR circuit EOR1 is low in level, and selects "0" when the output of the OR circuit EOR1 is high in level.

Therefore, when the OR circuit EOR1 detects intersection points Si (where i=1, 2, . . . ) of the received data RXD2 and the average level AVM, and the output thereof changes from the low level to the high level, "0" is supplied to the register REG11 by the selector SEL11 and the value held in the register REG11 is set to "0". When the output of the OR circuit EOR1 changes to the low level, the selector SEL11 is brought to a state of supplying the output of the incrementor INC1 to the register REG11. Since the register REG11 is configured so as to capture or take in the input according to the clock CLK, a value obtained by incrementing the value held in the register REG11 by "1" by means of the incrementor IC1 is taken in the register REG11 each time the clock CLK is inputted. Thus, the register REG11 operates as a counter.

At a stage subsequent to the register REG11, there are provided a comparator CMP12 for comparing the value held in the register REG11 with the maximum value MAX of the allowable range, and a comparator CMP13 for comparing the value held in the register REG11 with the minimum value MIN of the allowable range. Of these, the comparator CMP12 outputs a high level when the value held in the register REG11 is smaller than the maximum value MAX. The comparator CMP13 outputs a high level when the value held in the register REG11 is larger than the minimum value MIN. An AND circuit AND1 for ANDing the outputs of the comparators CMP12 and CMP13 is provided at a stage subsequent to each of the comparators CMP12 and CMP13. When the intersection-point interval Ti equal to its corresponding value held in the register REG11 falls within the allowable range, the output of the AND circuit AND1 is brought to a high level.

The output of the AND circuit AND1 results in a control signal of the selector SEL13 provided at a stage prior to the selector SEL12. "0" is inputted to one input terminal of the selector SEL13, and the output of an incrementor INC2 is inputted to the other terminal thereof. A register REG12 is connected to an output terminal of the selector SEL12 provided at the subsequent stage of the selector SEL13. The value held in the register REG12 is supplied to the incrementor INC2, thereby forming a loop. Thus, they constitute a counter COUNT2. The selector SEL13 selects "0" during a period in which the output of the AND circuit AND1 is low in level, and selects the output of the incrementor INC2 when the output thereof is high in level.

Further, the selector SEL12 is operated so as to return the value held in the register REG12 to the input of the register REG12 according to the low level of the output of the OR circuit EOR1 during a period in which the OR circuit EOR1 does not detect the intersection points Si of the received data RXD2 and the average level AVM, and selects the output of the selector SEL13 when the OR circuit EOR1 detects the intersection points Si and the output of the OR circuit EOR1 is brought to the high level.

Therefore, the selector SEL13 supplies "0" to the selector SEL12 when each intersection-point interval Ti is out of the allowable range and the output of the AND circuit AND1 becomes low in level. When the OR circuit EOR1 detects the intersection points Si and the output thereof is brought to the high level, the selector SEL12 is switched to supply the above "0" to the register REG12, so that the value held in the register REG12 is reset to "0".

On the other hand, when the corresponding intersection-point interval Ti falls within the allowable range, the output of the AND circuit AND1 is brought to a high level. Thus, the selector SEL13 is brought to a state of supplying the output of the incrementor INC2 to the selector SEL12. When the OR circuit EOR1 detects the intersection points Si and the output thereof becomes high in level, the selector SLE12 is switched to supply the output of the incrementor INC2 to the register REG12. Therefore, when the state of the intersection-point intervals Ti falling within the allowable range is made continuous, a value obtained by incrementing the value held in the register REG12 by "1" by means of the incrementor INC2 is brought into the register REG12 each time the OR circuit EOR1 detects the intersection points Si. Thus, the register REG12 operates as a counter for counting the number of times that the intersection-point intervals Ti continuously fall within the allowable range.

At a stage subsequent to the register REG12, there are provided an OR circuit OR11 for ORing respective bits of the register REG12, and a comparator CMP14 for comparing the value held in the register REG12 with a set value "n". When the number of times that the intersection-point intervals Ti fall within the allowable range, is made continuous, any of the bits of the register REG12 is brought to "1". Therefore, the output of the OR circuit OR11 results in a continuous detect signal CCC indicating that the number of times that the intersection-point intervals Ti fall within the allowable range, is continuous. On the other hand, in the present embodiment, the compare set value "n" of the comparator CMP14 for comparing each value held in the register REG12 and the set value "n" is set to "2". Thus, when the number of times that the intersection-point intervals Ti fall within the allowable range, is made continuous two or more, an output BBB of the comparator CMP14 is changed to a high level.

Now, the received data in which the intersection-point intervals lying within the allowable range are continuous, contains a preamble pattern and a pseudo or dummy preamble pattern. The reason why the compare set value "n" of the comparator CMP14 is set to "2", is that the number of times that the intersection-point intervals lying within the allowable range at the input of the normal preamble pattern under the Bluetooth standard are made continuous, is "4". Thus, the set value "n" is set to any of "2", "3" and "4" under Bluetooth standard. There is a possibility that when the set value is "1", the normal data will also be detected as part of the preamble pattern. Whether the data is of the preamble pattern, can be determined in the early stages by setting the set value to "2" other than "3" or "4".

Figure 13:
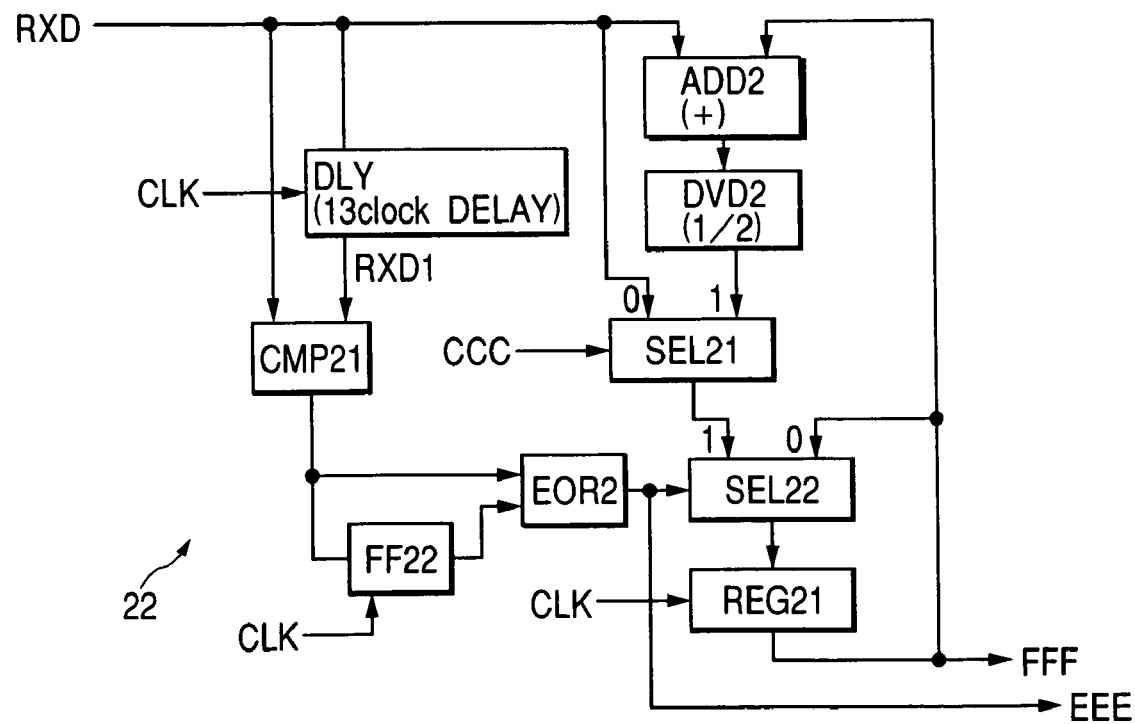
FIG. 13 is a block diagram illustrating an example of a more detailed configuration of an intersection-point averaging circuit which constitutes the offset cancel circuit.

An example of a configuration of the intersection-point averaging circuit 22 constituting the offset cancel circuit 120 shown in FIG. 2 is illustrated in FIG. 13. The intersection-point averaging circuit 22 according to the present embodiment is a circuit for suppressing a significant change in the detection level of each of the intersection points of the received data RXD and data obtained by delaying it by one symbol period during a period in which the intersection-point intervals lying within the allowable range are continuous.

Therefore, the intersection-point averaging circuit 22 according to the present embodiment includes a delay circuit DLY for delaying the received data RXD demodulated by the demodulator 118 by one symbol period, i.e., 13 cycles of the reference clock CLK, a comparator CMP21 for comparing data RXD1 of one-symbol past, which is delayed by the delay circuit DLY, with the present received data RXD, a flip-flop FF22 for holding the result of determination by the comparator CMP21, an OR circuit EOR2 for exclusively ORing the present result of determination by the comparator CMP21 and the immediately-preceding result of determination held in the flip-flop FF22, a selector SEL22 switched according to a signal outputted from the OR circuit EOR2, etc.

Assuming that the comparator CMP21 outputs a high level signal when the present received data RXD is greater than the one-symbol-old data RXD1, the action that the output of the OR circuit EOR2 for exclusively ORing the present result of decision and the immediately-preceding result of decision has changed from a low level to a high level, means that the present result of decision and the immediately-preceding result of decision are different from each other, i.e., the line indicative of the received data RXD and the line indicative of the one-symbol-old data RXD1 intersect in FIG. 4.

The output of a selector SEL21 provided at a stage prior to the selector SEL22 is inputted to one input terminal of the selector SEL22, and the corresponding value held in a register REG21 of a subsequent stage is feed-back inputted to the other terminal thereof. Further, the received data RXD is inputted to one input terminal of the selector SEL21, and a value obtained by setting a value obtained by adding the received data RXD and the value held in the register REG21 by means of an adder ADD2, to ½ with a divider DVD2 is inputted to the other input terminal thereof. The selector SEL21 selects the received data RXD when a continuous detect signal CCC indicating that the intersection-point intervals lying within the allowable range from the intersection-point interval detection circuit 21B3 shown in FIG. 11 are continuous, is low in level (i.e., the intersection-point intervals are discontinuous), and selects the output of the divider DVD2 when the continuous detect signal CCC is high in level, i.e., the intersection-point intervals are continuous.

Therefore, when the intersection-point intervals lying within the allowable range are not continuous (data other than the "0"/"1" alternate pattern is inputted) when the OR circuit EOR2 has detected the intersection points S of the RXD and RXD1, the received data RXD is set to the register REG21 as an initial value via the selectors SEL21 and SEL22. On the other hand, when the intersection-point intervals lying within the allowable range are continuous when the OR circuit EOR2 has detected the intersection points S, the input present received data RXD and the corresponding value held in the register REG21 are added together and a value obtained by dividing the same by "2", i.e., an average value is retained in the register REG21 via the selectors SEL21 and SEL22. Further, when the OR circuit EOR2 does not detect the intersection points S of the RXD and RXD1, the selector SEL22 selects the output of the register REG21. Therefore, the register REG21 continues to hold the previously-calculated average value as it is.

Thus, the intersection-point average value is outputted for each intersection-point detection during a period in which the continuous detect signal CCC is high in level, and the intersection-point value is outputted for each intersection-point detection during a period in which it is low in level. The intersection-point averaging circuit 22 illustrated in the present embodiment outputs the output of the OR circuit EOR2 to the next-stage decision level arithmetic circuit 23 as an intersection-point detect signal EEE and outputs the value held in the register REG21 thereto as an intersection-point average value FFF. Incidentally, since the flip-flop FF22 performs a latch operation according to the reference clock CLK, the intersection-point detect signal EEE is rendered high in level only during one clock cycle in which each of the intersection points of the received data RXD and the one-symbol-old data RXD1 is detected.

Figure 14:
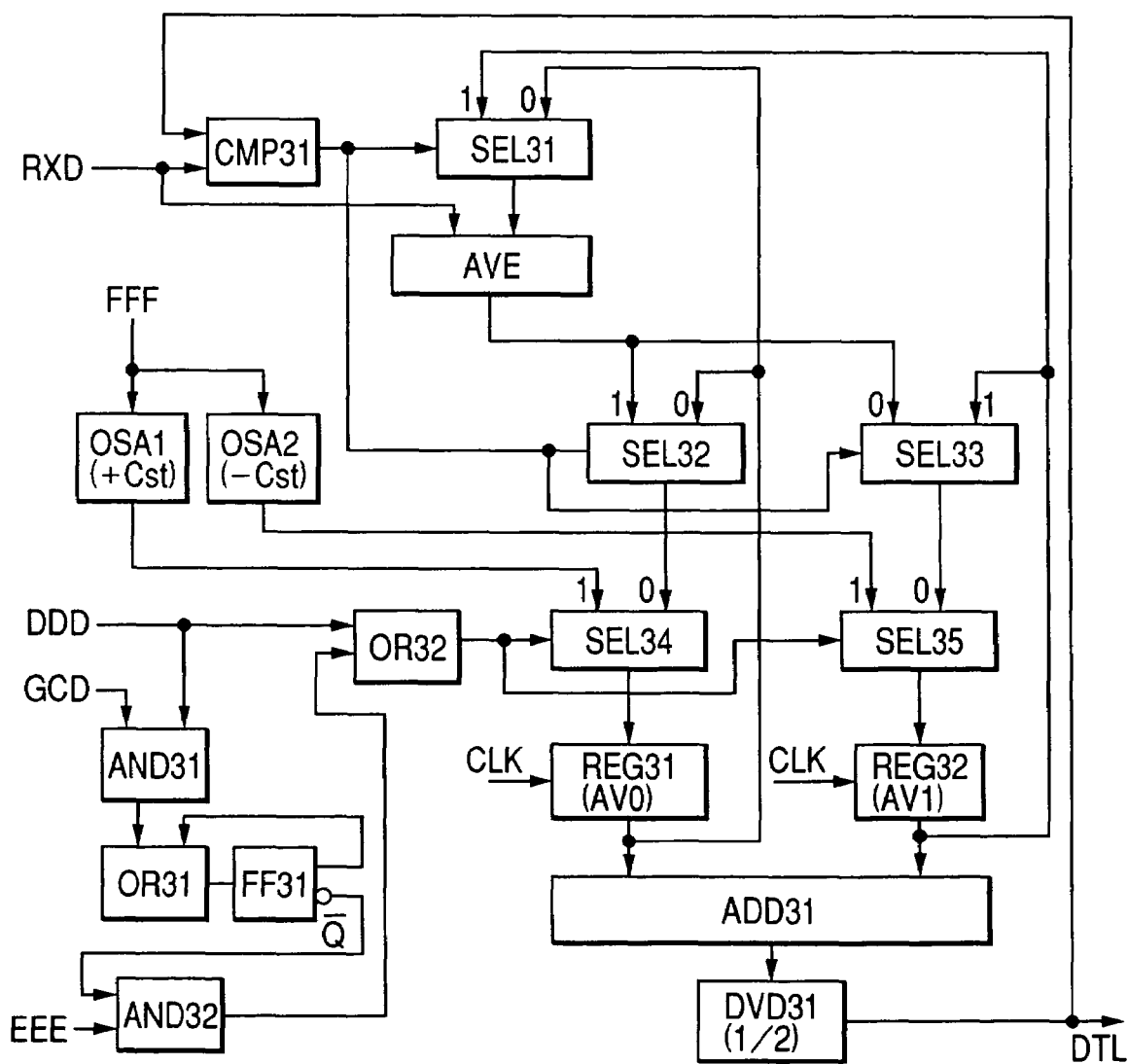
FIG. 14 is a block diagram depicting an example of a more detailed configuration of a decision level arithmetic circuit which constitutes the offset cancel circuit.

An example of a configuration of the decision level arithmetic circuit 23 constituting the offset cancel circuit 120 shown in FIG. 2 is shown in FIG. 14.

The decision level arithmetic circuit 23 illustrated in the present embodiment can comprise a comparator CMP31 for comparing a value obtained by feeding back a decision level DTL outputted from the decision level arithmetic circuit 23 with input received data RXD, a register REG31 for holding a "0" modulation-side average level AV0 therein, a register REG32 for holding a "1" modulation-side average level AV1 therein, a selector SEL31 for selecting the value held in the register REG31 or the value held in the register REG32 according to the output of the comparator CMP31 and supplying the same to a next-stage averaging circuit AVE, a selector SEL32 for selecting the value held in the averaging circuit AVE or the register REG31 according to the output of the comparator CMP31 in a manner similar to the above, a selector SEL33 for selecting the output of the averaging circuit AVE or the value retained in the register REG32, etc. The averaging circuit AVE is a circuit for calculating an average value of the present input received data RXD and the "0" modulation-side average level AV0, or an average value of the RXD and the "1" modulation-side average level AV1, and can comprise an adder and a divider.

The decision level arithmetic circuit 23 employed in the present embodiment also includes offset application circuits OSA1 and OSA2 for respectively applying or giving a "0" modulation-side offset + Cst and a "1" modulation-side offset − Cst to the intersection-point average value FFF supplied from the intersection-point averaging circuit 22 shown in FIG. 13, selectors SEL34 and SEL35 for selecting the outputs of the offset application circuits OSA1 and OSA2 or values selected by the selectors SEL32 and SEL33 and supplying them to the registers REG31 and REG32 respectively, an adder ADD31 for adding the value held in the register REG31 and the value held in the register REG32, and a divider DVD31 for dividing the result of addition into ½. The offset application circuits OSA1 and OSA2 are respectively used to apply the first average values to the registers REG31 and REG32.

The average value of the intersection-point average value FFF calculated by the intersection-point averaging circuit 22 and the input received data RXD is calculated as described above for the reason for correcting a decision level according to variations in modulation level even while data is being received, because the frequency of the carrier wave on the transmitting side is gradually shifted even after the decision level has been determined based on the preamble pattern. For the purpose of allowing the average value of modulation levels of the received data RXD to converge faster, the values supplied with the offsets by the offset application circuits OSA1 and OSA2 are respectively first set to the registers REG31 and REG32 and divided into the "0" modulation-side average level AV0 and the "1" modulation-side average level AV1 to thereby calculate the average value of each of them and the input received data RXD.

Incidentally, the above method for detecting the average levels with the two systems of the plus and minus sides of the modulation level respectively is not a configuration essential for the present invention. The method can be also set to one system alone. In this case, it is unnecessary to give the offset Cst to the average value (FFF) first set to the register REG31 (or REG32). Namely, the offset application circuits OSA1 and OSA2 become unnecessary where the method is configured as one system.

Further, the decision level arithmetic circuit 23 shown in FIG. 14 is provided with an AND circuit AND31, an OR circuit OR31, a flip-flop FF31, an AND circuit AND32 and an OR circuit OR32 in order to bring the intersection-point average value FFF outputted from the intersection-point averaging circuit 22 into the registers REG31 and REG32 each time the intersection points of the received data RXD and the data obtained by delaying it by one symbol period are detected, before the gain of the AGC circuit 115 converges.

Of these, the AND circuit AND31 is inputted with the preamble pattern detect signal DDD supplied from the preamble pattern detection circuit 21 and a gain convergent signal GCD supplied from the error detection circuit 121. The OR circuit OR31 is inputted with the output of the AND circuit AND31 and the output of the flip-flop FF31. Further, the AND circuit AND32 is inputted with an inverse output /Q of the flip-flop FF31 and the intersection-point detect signal EEE outputted from the intersection-point averaging circuit 22. The OR circuit OR32 is inputted with the output of the AND circuit AND32 and the preamble pattern detect signal DDD.

Figure 15:
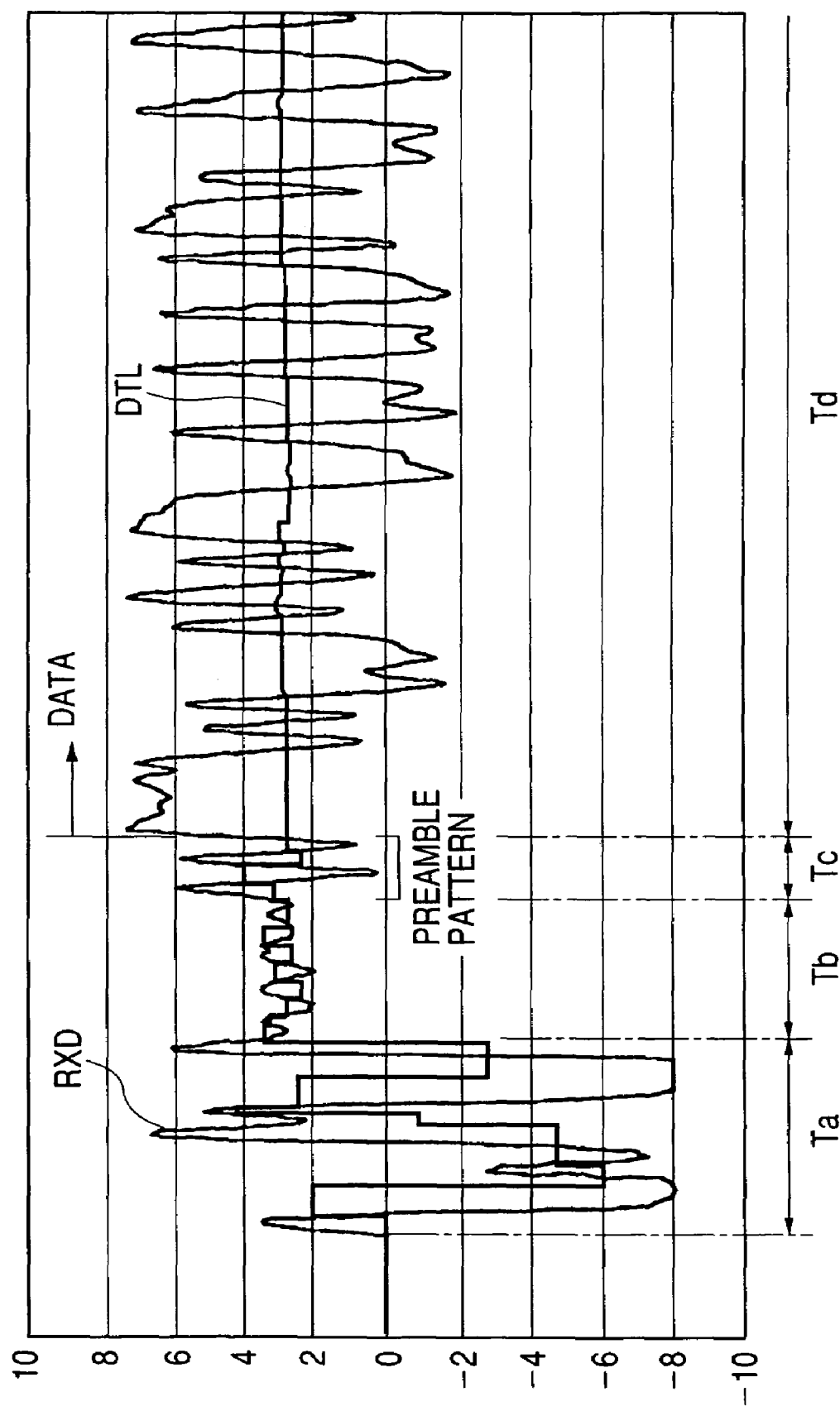
FIG. 15 is a waveform diagram showing the way of generating decision levels by the offset cancel circuit employed in the embodiment.

Thus, since the gain convergent signal GCD is not brought to a high level in a state prior to the input of a preamble pattern like a period Ta in FIG. 15 by way of example, and immediately after reception commencement free of gain convergence as well, the flip-flop FF31 holds a low level so that its inverse output /Q is rendered high in level, whereby the AND circuit AND32 is brought to an open state. Therefore, the selectors SEL34 and SEL35 are switched to the offset application circuits OSA1 and OSA2 via the OR circuit OR32 each time the intersection-point detect signal EEE is inputted from the intersection-point averaging circuit 22.

As a result, values obtained by applying offsets +Cst and −Cst to the intersection-point average value FFF supplied from the intersection-point averaging circuit 22 are respectively brought into the registers REG31 and REG32 for each intersection-point detection. Further, values obtained by averaging the values and the input received data RXD are thereafter brought into the registers REG31 and REG32, and a decision or determination level DTL is formed based on the values.

During a period Tb of FIG. 15 in which the gain convergence is done by the AGC circuit 115, the gain convergent signal GCD is next asserted high in level in the course thereof. However, the operation of the decision level arithmetic circuit 23 of FIG. 14 remains unchanged owing to its action. Subsequently, during a period Tc of FIG. 15 in which the preamble pattern is inputted, the preamble pattern detect signal DDD is asserted high in level in the course thereof during a period Tc of FIG. 15 inputted with the preamble pattern. In doing so, the output of the AND circuit AND31 is changed to a high level and the state of the flip-flop FF31 is inverted to change the inverse output /Q to a low level. Thus, the AND circuit AND32 produces an output a low level and reaches a state of having cut off the intersection-point detect signal EEE outputted from the intersection-point averaging circuit 22.

On the other hand, when the preamble pattern detect signal DDD is asserted high in level, the selectors SEL34 and SEL35 are switched to the offset application circuits OSA1 and OSA2 via the OR circuit OR32. Thus, the values obtained by applying the offsets +Cst and −Cst to the intersection-point average value FFF supplied from the intersection-point averaging circuit 22 are respectively supplied to the registers REG31 and REG32 during the period in which the preamble pattern detect signal DDD is high in level. After the preamble pattern detect signal DDD is negated low in level, the selectors SEL34 and SEL35 are switched to the selectors SEL33 and SEL34. As a result, the value obtained by averaging the value of the register REG31 or REG32 and the input received data RXD is taken in the register REG31 or REG32 during a period Td of FIG. 15 in which the original data is inputted, and hence a determination level DTL is formed based on it.

While the invention made above by the present inventors has been described specifically based on the illustrated embodiments, the present invention is not limited to the embodiments. It is needless to say that various changes can be made thereto with the scope not departing from the substance thereof. While the above embodiment has described the case in which the transmission-system circuit and the reception-system circuit are formed on one semiconductor chip, for example, the present invention can be applied even to a semiconductor integrated circuit device wherein a reception-system circuit and a transmission-system circuit are respectively formed on discrete semiconductor chips.

While the above description has principally been made of the case in which the invention made by the present inventors is applied to a communication semiconductor integrated circuit device used in a wireless communication system of a Bluetooth standard which belongs to the field of application corresponding to the background of the invention, the present invention is not limited to it. The present invention can be used for a reception-system circuit in general of a semiconductor integrated circuit device used in a wireless communication system of an FM-modulation scheme, wherein a "0"/"1" alternate pattern is provided at the head of data to perform communications.

Advantageous effects obtained by a typical one of the inventions disclosed in the present application will be described in brief as follows:

In a demodulating semiconductor integrated circuit device used in a wireless communication system of an FM-modulation scheme, a circuit for canceling a frequency offset can be made up of a digital circuit. Thus, it is possible to make a high-accuracy decision as to received data and prevent error frequency offset cancel due to a pseudo pattern contained in the received data. Consequently, a high-accuracy received data decision can be carried out.

Drawings

FIG. 1
118 . . . DEMODULATOR
119 . . . DETERMINATION CIRCUIT
120 . . . OFFSET CANCEL CIRCUIT
121 . . . ERROR DETECTION CIRCUIT
131 . . . GAUSS FILTER
136 . . . COUNTER
137 . . . PHASE COMPARATOR
300 . . . BASEBAND UNIT

FIG. 2
RXD (RECEIVE DATA)
GCD (GAIN CONVERGENT SIGNAL)
21 . . . PREAMBLE PATTERN DETECTION CIRCUIT
21A . . . PATTERN RECOGNITION CIRCUIT
21B . . . LEVEL DETECTION CIRCUIT
21C . . . AND CIRCUIT
22 . . . INTERSECTION-POINT AVERAGING CIRCUIT
23 . . . DECISION LEVEL ARITHMETIC CIRCUIT
120 . . . OFFSET CANCEL CIRCUIT

FIG. 3
21A1 . . . CLOCK DELAY CIRCUIT
21A2 . . . MINIMUM AMPLITUDE DETERMINATION CIRCUIT
21A3 . . . MAXIMUM AMPLITUDE DETERMINATION CIRCUIT
21A4 . . . VERTICAL SYMMETRY DETERMINATION CIRCUIT
21A5 . . . AMPLITUDE-DIFFERENCE-BETWEEN-SYMBOLS DETECTION
Circuit
21A6 . . . DIFFERENCE-IN-INTERACTION-POINT-LEVEL DETECTION
Circuit
21A7 . . . AND CIRCUIT FIG. 5
21B1 . . . LEVEL REDUCTION CIRCUIT (FIR FILTER)
21B2 . . . LEVEL AVERAGING CIRCUIT
21B3 . . . INTERSECTION-POINT INTERVAL DETECTION CIRCUIT

FIG. 10
PREAMBLE PATTERN DETECTION
HIGH-GAIN AVERAGING LOW-GAIN AVERAGING

FIG. 13
DELAY

FIG. 15
DATA
PREAMBLE PATTERN

What is claimed is:

1. A system for wireless communication complying with a communication scheme defined to carry out data transmission with a predetermined pattern being added to a head of to be transmitted data, and including a semiconductor integrated circuit device, the semiconductor integrated circuit device comprising:
a first conversion means for converting a receive signal, which is an analog signal including the predetermined pattern added in front of transmitted data, into a digital signal;
a demodulation means for demodulating the digital signal and outputting a demodulated data;
a detection means for receiving the demodulated data, recognizing the predetermined pattern added in front of the transmitted data, and generating a determination level signal , said detection means being made up of a digital circuit; and
a determination means for determining the demodulated data based on the determination level signal,
wherein the determination level signal instructs a threshold level of high data or low data for determining the demodulated data, so that the semiconductor integrated circuit device cancels a frequency offset from the receive signal.

2. A system for wireless communication according to claim 1, wherein the detection means includes a first circuit which detects the predetermined pattern, a second circuit which detects a center level of the demodulated data, and a third circuit which generates the determination level signal and determines the demodulated data based on a signal detected by the first circuit and a center level detected by the second circuit.

3. A system for wireless communication according to claim 2, wherein the second circuit detects levels of intersection points of the demodulated data and data obtained by delaying the demodulated data by one symbol period, and outputs an average value of the detected intersection-point levels as the center level.

4. A system for wireless communication according to claim 2, wherein the first circuit includes a pattern recognition circuit which recognizes the predetermined pattern contained in the demodulated data, a level detection circuit which detects an average level of the demodulated data, and an operation circuit which receives outputs of the pattern recognition circuit and the level detection circuit and generates a predetermined pattern detect signal.

5. A system for wireless communication according to claim 2, wherein the third circuit sets a value obtained by adding a predetermined value to the center level received from the second circuit as a first initial value, sets a value obtained by subtracting a predetermined value from the center level as a second initial value, averages the first initial value and the demodulated data with respect to a received-data level increasing direction to obtain a first average value, averages the second initial value and the demodulated data with respect to a received-data level decreasing direction to obtain a second average value, and outputs a value obtained by averaging the first and second average values as a determination level.

6. A system for wireless communication according to claim 1, further comprising a transmitting/receiving antenna;

transmit-receive selecting means for switching to connections between the antenna and a reception-system, said reception-system including the first conversion means, the demodulation means, the detection means, and a determination means or a transmission-system circuit which is formed on the semiconductor integrated circuit device; and a baseband circuit which generates data delivered to the transmission-system circuit and processes data received from the reception-system circuit.

* * * * *